UNITED STATES PATENT OFFICE.

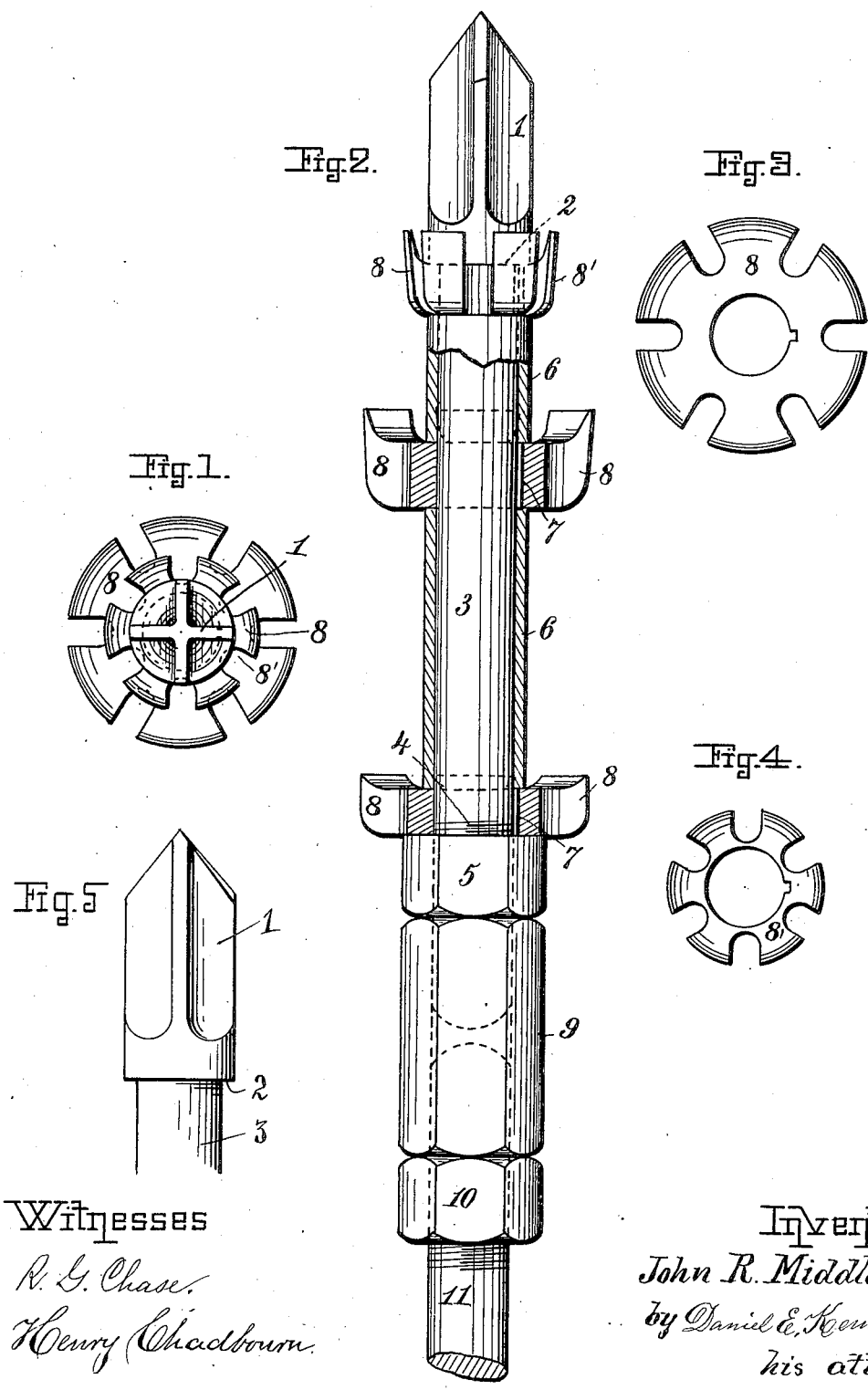

JOHN R. MIDDLETON, OF EVERETT, MASSACHUSETTS.

TUBE OR FLUE CLEANER.

No. 878,145.　　　　Specification of Letters Patent.　　　　Patented Feb. 4, 1908.

Application filed December 19, 1905. Serial No. 292,477.

*To all whom it may concern:*

Be it known that I, JOHN R. MIDDLETON, of Everett, in the county of Middlesex and State of Massachusetts, have invented certain new and useful Improvements in Tube or Flue Cleaners, of which the following is a specification.

My invention relates to improvements in boiler tube or flue cleaners; and it consists in the novel construction and combination of parts hereinafter more fully described and especially pointed out in the claims.

In the drawings, Figure 1 is an end elevation of my complete invention. Fig. 2 is a side elevation partly in section of the same. Figs. 3 and 4 are plan views of the fluted cup-shape cutters, showing approximately their relative diameters. Fig. 5 is a detail of a portion of the shank at the drill end.

The object of my invention is to construct and provide a simple and durable device for removing the deposit and incrustation from the interior of boiler tubes and flues.

Referring again to the drawings, 1 represents a fluted, drill-pointed member having at one end the shoulder 2, formed by the reduced shank-portion 3, which latter is provided with the screw-threaded end 4 and nut 5. The shank portion is also provided with suitable collars 6, and keys 7 the latter integral with the shank, all substantially as shown and for the purpose hereinafter described.

A series of circular cutters 8, are arranged upon the shank portion 3 and are kept a suitable distance apart by the collars 6 before referred to; the cutters being held from revolving on the shank portion by the keys 7, within suitable keyways or slots in said cutters. A circular cutter 8' of smaller diameter than the cutters 8 is also disposed next to the shoulder 2 of the shank and bearing against the same and held in place by one of the collars 6. The whole device, including drill, cutters and collars, is held intact by being clamped together between the shoulder 2 and nut 5 on the shank portion.

The circular cutters are concave or cup-shaped upon their cutting faces and are fluted longitudinally to form escape passages for the broken fragments and debris of the deposit or incrustation, as the device is forced through the interior of the tube or flue. The cutters are preferably tapering longitudinally upon their periphery so as to be somewhat smaller at the back or rear end and thus give a slight clearance to the cutting edge, although they might be straight like the rear or last cutter of the series, which merely acts as a guide-member to hold the device central within the tube, being of the same diameter as the cutter preceding it, and both cutters being only slightly smaller than the interior of the tube or flue.

The circular cutters and fluted drill, are preferably made of tool steel hardened and drawn to about a cold chisel temper, thus forming a durable tool for cutting and removing the incrustation from boiler tubes and flues, especially those in marine service, wherein the incrustation which forms within the interior of the tube or flue is of great density and hardness, owing to the deposit of saline and other deleterious matter from the use of salt water under the action of intense heat. The improved device is therefore especially adapted to marine service.

In the drawings I have shown the device as preferably made up of three cup-shaped cutters mounted upon the shank of the fluted drill, the two cutters nearest the point of the drill being of different diameters, and these together with the fluted drill form a graduated cutting device. The object of graduation in the diameters of the cutters composing the device, is to distribute the work and thus cut out the incrustation or deposit within the tube or flue by successive steps, the drill point first making a small hole and then the two following cutters gradually enlarging the hole to substantially the size of the interior of the tube or flue, thus making the work much easier than if the work devolved upon one cutter alone. However, the number of cutters may be varied at pleasure to suit the work. For stationary or land boilers using fresh water, the incrustation or deposit within the tube or flue is of a much different character and not as hard to remove as in the former case, and two graduations in the cutting device might be sufficient. This change, together with slight modifications in the device, could of course be made without departing from the spirit and scope of my invention.

The cutters may easily be removed and replaced by others of different diameters, so that the device can be readily adapted to tubes and flues of various sizes. The device is provided with a screw-threaded socket 9, and a nut 10, for lengthening out the rod 11, of the drill-pointed member in the usual manner, and is operated in the ordinary way of using such devices in order to force it through the tube or flue, as will be clearly understood by those familiar with this class of invention.

I am aware that it is not new to graduate the diameters of the cutters or scraping members, and that it is old in the art to separate them by sleeves or collars, and also that it is old to provide a fluted or slotted scraper, and therefore I make no claim broadly for such inventions, but confine myself to the specific construction and combination of parts herein shown and described.

Having thus fully described my invention, I desire to secure by Letters Patent and to claim—

1. A boiler tube or flue cleaner comprising a fluted drill pointed member having one end reduced to form a shank and a shoulder, the shank having a screw-threaded portion, a plurality of cup-shaped cutters fixedly mounted upon the shank portion of the drill-pointed member, one cutter differing in form from the remaining cutters and disposed adjacent the aforesaid shoulder, and collars mounted upon the shank to hold the cutters in spaced relation.

2. A boiler tube or flue cleaner composed of a fluted drill-pointed member having a reduced portion forming a shank and a shoulder, the shank having a screw-threaded portion, a plurality of cup-shaped cutters fixedly mounted upon said shank portion, all of the cutters being fluted and one cutter being disposed against said shoulder, a nut upon the shank, spaced collars between the cutters and said shoulder and nut to hold the cutters in spaced relation, a screw-threaded socket sleeve to receive the free end of said shank, a shank extension 11 secured in said socket sleeve, and a nut fitted upon said shank extension.

In testimony whereof I have affixed my signature, in presence of two witnesses.

JOHN R. MIDDLETON.

Witnesses:
DANIEL E. KEMPSTER,
WILLIAM H. HOWES.